United States Patent
Eberle et al.

(10) Patent No.: US 6,990,098 B1
(45) Date of Patent: Jan. 24, 2006

(54) RELIABLE MULTICAST USING MERGED ACKNOWLEDGEMENTS

(75) Inventors: Hans Eberle, Mountain View, CA (US); Nils Gura, Ulm (DE)

(73) Assignee: Sun Microsystems, Inc., Sunnyvale, CA (US)

( * ) Notice: Subject to any disclaimer, the term of this patent is extended or adjusted under 35 U.S.C. 154(b) by 835 days.

(21) Appl. No.: 09/659,106

(22) Filed: Sep. 11, 2000

(51) Int. Cl.
*H04L 12/56* (2006.01)

(52) U.S. Cl. .............. 370/390; 370/312; 370/432; 370/474; 370/476

(58) Field of Classification Search .............. 370/312, 370/389, 390, 432, 473, 474–476
See application file for complete search history.

(56) References Cited

U.S. PATENT DOCUMENTS

| | | | | |
|---|---|---|---|---|
| 5,297,143 A | * | 3/1994 | Fridrich et al. | 370/445 |
| 5,444,705 A | * | 8/1995 | Olnowich et al. | 370/388 |
| 5,502,756 A | * | 3/1996 | Crocker et al. | 379/27.02 |
| 5,541,927 A | | 7/1996 | Kristol et al. | |
| 5,835,723 A | * | 11/1998 | Andrews et al. | 709/226 |
| 5,905,871 A | * | 5/1999 | Buskens et al. | 709/245 |
| 6,067,567 A | * | 5/2000 | Bartfai et al. | 709/221 |
| 6,122,275 A | * | 9/2000 | Karol et al. | 370/389 |

FOREIGN PATENT DOCUMENTS

EP 0 771 131 A2 5/1997

OTHER PUBLICATIONS

Moon, Sang-Jun et al., "Scalable and reliable ATM multicast employing RM cell consolidation", Electronics Letters, Nov. 11, 1999, vol. 35, No. 23.

* cited by examiner

*Primary Examiner*—Brian Nguyen
*Assistant Examiner*—Tri H. Phan
(74) *Attorney, Agent, or Firm*—Zagorin O'Brien Graham LLP (57) ABSTRACT

A source multicasts information to a plurality of targets. The targets respond to the multicast information by sending acknowledgements that indicate receipt of the multicast information. The acknowledgements are merged into a merged acknowledgment, which is then supplied to the source. The source can determine from the merged acknowledgement whether the targets successfully received the multicast information.

18 Claims, 6 Drawing Sheets

RELIABLE MULTICAST USING MERGED ACKNOWLEDGEMENTS

BACKGROUND OF THE INVENTION

1. Field of the Invention

The invention relates to communication of information and more particularly to multicast operations.

2. Description of the Related Art

In current computing environments, especially networked environments, a source node on the network may wish to supply a plurality of destination nodes with the same information. In such situations, some systems provide a multicast capability in which the source node can send multiple destination nodes the same information at the same time. In such multicast operations, any number of multiple targets can receive the multicast information.

Figure 1:
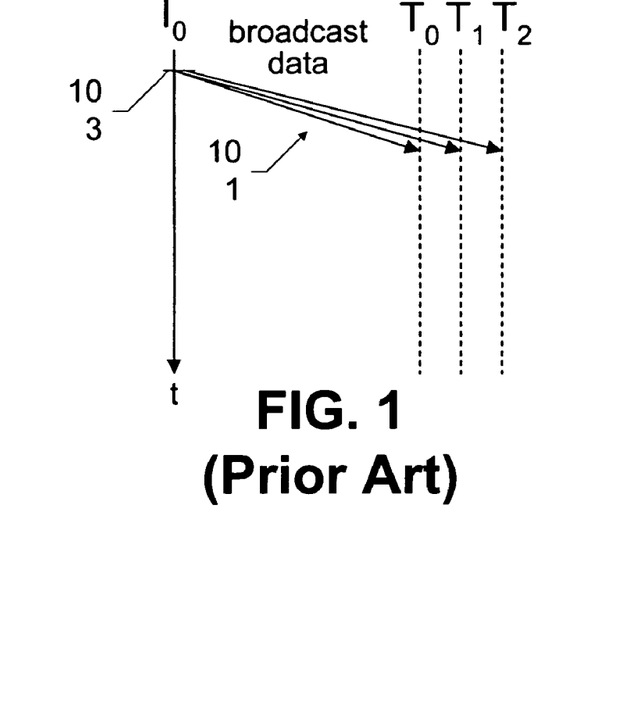
FIG. 1 illustrates operations of an unreliable multicast operation in which no acknowledgements are provided by the targets.

Referring to FIG. 1, a multicast operation is illustrated in which an initiator node $I_0$ simultaneously sends the same information to target nodes $T_0$, $T_1$, and $T_2$. Because the destination or target nodes can receive the multicast information simultaneously, the multicast operation is time efficient.

One difficulty with multicasting simultaneous information is that it may be difficult for the initiator node who sends the information to determine if the target nodes successfully received the information. Thus, the operation is unreliable in the sense that the initiators cannot determine if the transmission was successful. If the receiving nodes send acknowledgements indicating successful receipt of the multicast information, there would be a tendency for the acknowledgements to collide or otherwise contend for resources of the communication medium. That is because the targets would likely send the acknowledgements to the initiator node at the same time. In a switched synchronous network, sending such acknowledgements could result in undesirable collisions and possible loss of acknowledgement information. In other systems, the acknowledgements may be buffered within the switch as collisions occur, or require retry as some targets would be unable to obtain the communication medium to send the acknowledgement. In either of those situations, the advantage of time efficiency is diminished if acknowledgements take a long time relative to the original multicast due to the contention for resources of the communication medium connecting the sending and receiving nodes.

Figure 2:
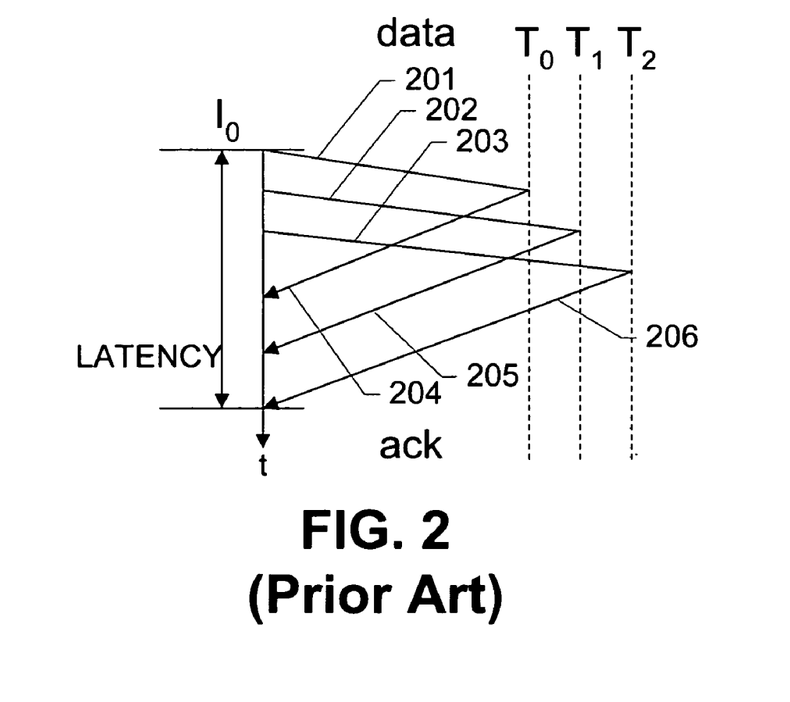
FIG. 2 illustrates operation of sequential operation.

One way to avoid such contentions and/or collisions is to provide the information sequentially as shown in FIG. 2, rather than simultaneously, as shown in FIG. 1. In the sequential operation, the initiator node $I_0$ successively sends the same information at 201, 202 and 203 to the target nodes $T_0$, $T_1$, and $T_2$. The target nodes respond sequentially with acknowledgements at 204, 205 and 206. Because the acknowledgements are sequential, they do not compete with each other for communication medium responses. Thus, the operation is reliable in the sense that the initiator can determine if the transmission was successful. However, the sequential nature of the operation for both the transmission of the information and the transmission of the acknowledgements eliminates an efficiency which could be gained from a true multicast operation in which multicast information is sent simultaneously. Thus, there is a relatively long latency for completion of the entire operation.

For certain time-critical multicast operations, it is important to minimize latency. For example, for time-critical multicast operations such as synchronization of clocks in a network, coherency protocols, and operations in databases/transaction systems such as commit or abort, minimizing latency would be advantageous.

Accordingly, it would be desirable to provide a multicast operation that is both efficient and reliable.

SUMMARY OF THE INVENTION

Accordingly, in one embodiment, the invention provides a method of multicasting, that simultaneously sends multicast information from a source to a plurality of targets. The targets respond to the multicast information by sending acknowledgements that indicate receipt of the multicast information. The acknowledgements are merged into a merged acknowledgement, which is then supplied to the source. The source can determine from the merged acknowledgement whether the targets successfully received the multicast information.

In an embodiment, the multicast information and acknowledgements are transmitted across a network switch and the switch merges the acknowledgements before forwarding the merged acknowledgement to the source.

In another embodiment, a method is provided for transmitting information between an initiator node in a network and a plurality of target nodes. The method includes transmitting information from the initiator node to the target nodes simultaneously; simultaneously sending acknowledgements from the multiple nodes indicating receipt of the information; combining the acknowledgements and sending the combined acknowledgements to the initiator node to indicate receipt of the multicast information by the target nodes.

In another embodiment, the invention provides a data network that includes a sending node and a plurality of receiving nodes coupled to simultaneously receive information from the sending node during a multicast operation and coupled to respectfully provide acknowledgements of successful receipt of the multicast information. A switching medium supplies the multicast information to the respective receiving nodes simultaneously. Logic in the switching medium receives and combines the respective acknowledgements to provide a combined acknowledgement to the sending node. The combined acknowledgement may be a logical combination of the individual acknowledgements.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 3:
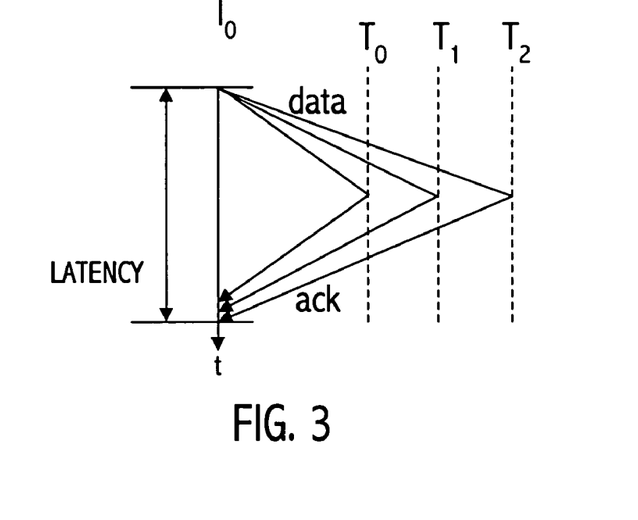
FIG. 3 illustrates operation of a reliable simultaneous multicast operation.

Referring to FIG. 3, operation of a reliable multicast operation is illustrated. Assume the system includes multiple nodes including the illustrated initiator node $I_0$ and three targets nodes $T_0$, $T_1$ and $T_2$. The initiator node $I_0$ sends information (data) to the three targets $T_0$, $T_1$ and $T_2$ simultaneously, i.e., the initiator node $I_0$ multicasts the information to the three targets. Each targets, assuming successful receipt, sends back an acknowledgement (ack) to the initiator node $I_0$. As described further herein, in order for the initiator node $I_0$ to receive the simultaneously sent acknowledgements, the acknowledgements are merged and then provided to the initiator node. The merger operation is described further herein.

Figure 4:
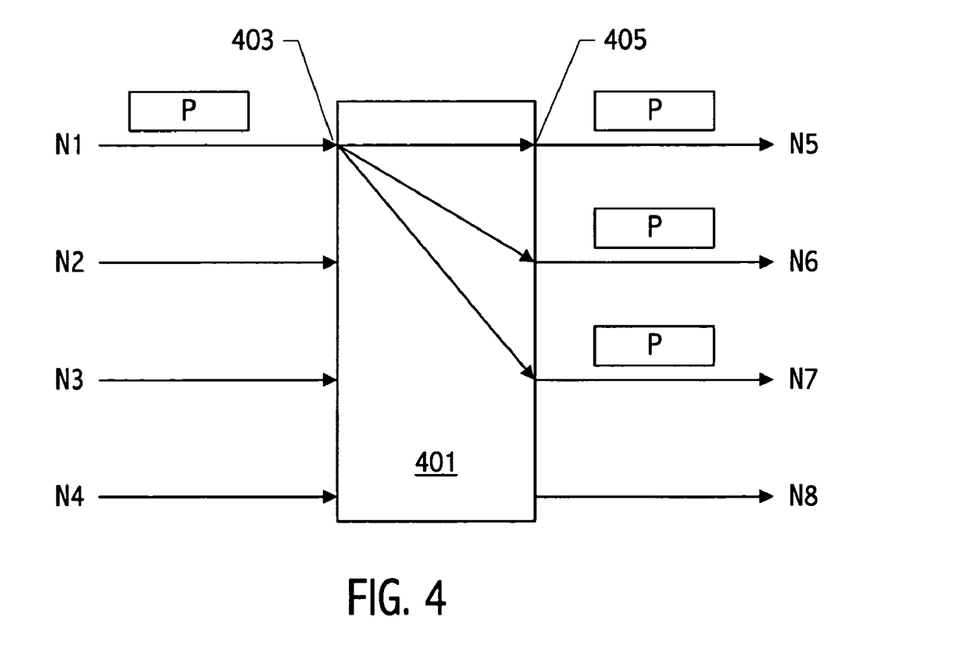
FIG. 4 illustrates an embodiment in which a multi-port switch is used for a multicast operation.

Referring to FIG. 4, the first part of a reliable multicast operation according to an embodiment of the invention is illustrated. In the first part of the multicast operation, the multicast information in the form of packet(s) P, is sent from initiator node N1 through input port 403 to target nodes N5, N6 and N7 across multiport switch 401. Note that packet(s) P may be one or more packets comprising one or more bytes of data and/or control information.

Figure 5:
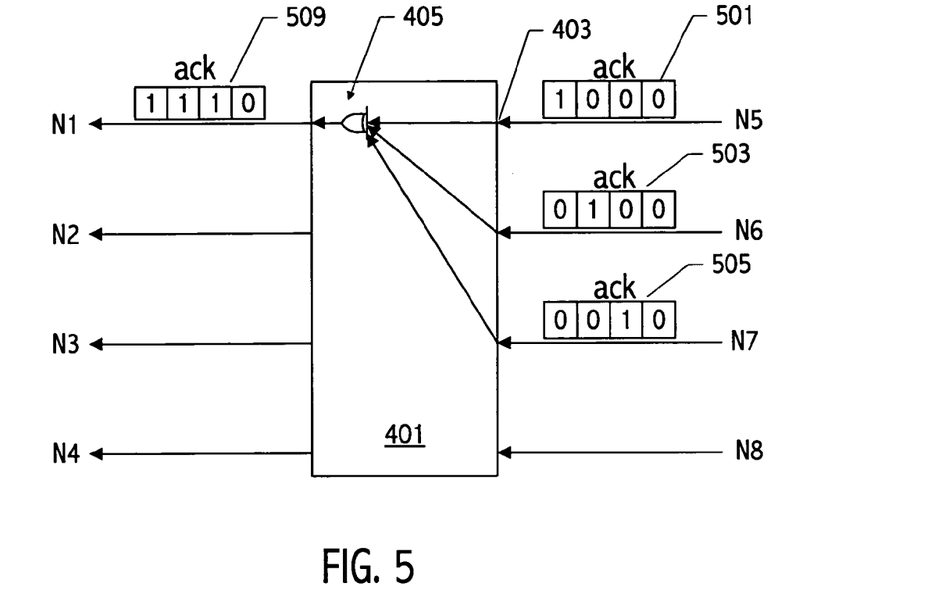
FIG. 5 illustrates an embodiment in which a multiport switch is used to merge the acknowledgements, which indicate successful completion of the multicast operation.

Referring to FIG. 5, the acknowledge phase of the multicast operation is illustrated. Nodes N5, N6 and N7, which received the multicast packet(s) P, respectively send acknowledge packets (ack) 501, 503 and 505 to node N1, which sent the multicast packet(s) P. Note that the exemplary acknowledge packets are shown in simplified form without information such as address, type of operation or other control information that would typically be associated with such a packet. Further note that a host typically contains both an initiator node and a target node and that the initiator and target share the input and output port of the switch. For example, N1 and N5 belong to the same host and send packets to input port 403 and receive packets from output port 405.

The exemplary multiport switch 401 includes four possible inputs and four possible outputs. Thus, in the embodiment illustrated in FIG. 5, the acknowledge packet (ack) from each multicast target node includes a vector of four bits, one bit corresponding to one of four possible output ports or targets on the switch. As illustrated in FIG. 5, the leftmost bit in the vector corresponds to node N5, the next bit to node N6, etc. Thus, when node N5 acknowledges the multicast, it sets the leftmost bit in its acknowledge vector 501 to indicate that N5 successfully received the multicast packet(s) P. Node N6 sets the bit second from the left in its acknowledge vector 503 to indicate that it successfully received the multicast packet(s) P. Node N7 sets the bit third from the left in its acknowledge vector 505.

Output port 405 merges the acknowledge packets received respectively from nodes N5, N6 and N7. As illustrated in FIG. 5, that can be accomplished by ORing together the acknowledge packets in OR logic in output port 507. When ORed together the merged acknowledgement packet 509 is generated and supplied to node N1. Node N1 can determine from the three bits set in merged acknowledge packet 509 that nodes N5, N6 and N7 successfully received the multicast packet(s) P. Thus, multiport switch 401 can provide a reliable and efficient multicast operation, since the acknowledge packets can be sent over the switch efficiently. That is made possible by the merging implemented in the output port.

Figure 6:
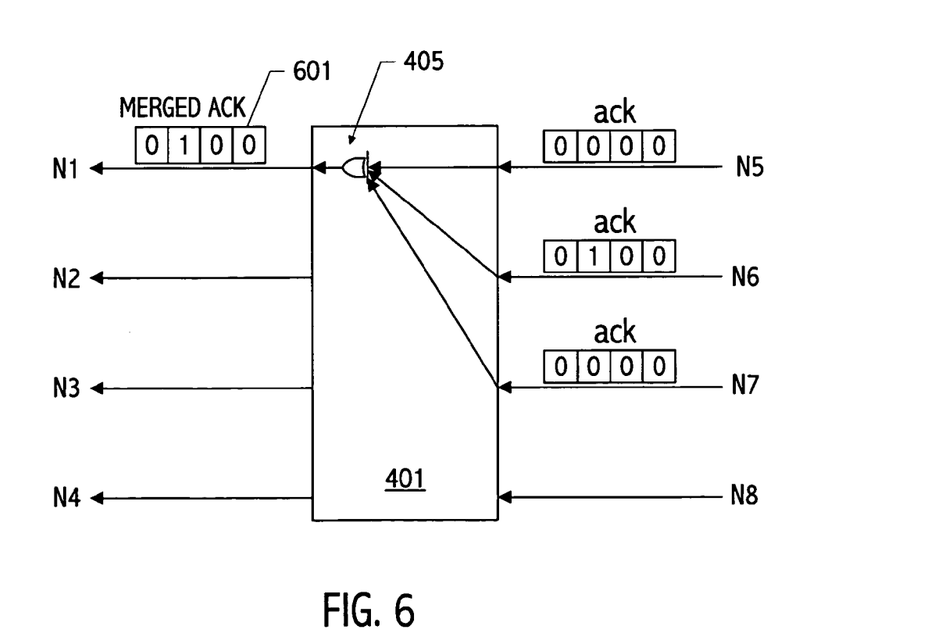
FIG. 6 illustrates an embodiment in which a multi-port switch is used to merge the acknowledgements, which indicate a failed multicast operation.

Referring to FIG. 6, another operation of the multicast acknowledge is illustrated when some of the target nodes of the multicast operation fail to correctly receive the multicast packet P. That may be the result of, e.g., uncorrectable errors detected by the receiving node. As can be seen, only node N6 correctly received the multicast packet(s) P as indicated by the "0100" in its acknowledge packet. When the acknowledge packets from N5, N6 and N7 are ORed together, merged acknowledge packet 601 results which indicates that errors were detected by two nodes (N5 and N7). Using that information, the node initiating the multicast node can take appropriate action in response to the detected errors, such as resending the multicast packet P to the nodes that failed.

Figure 7:
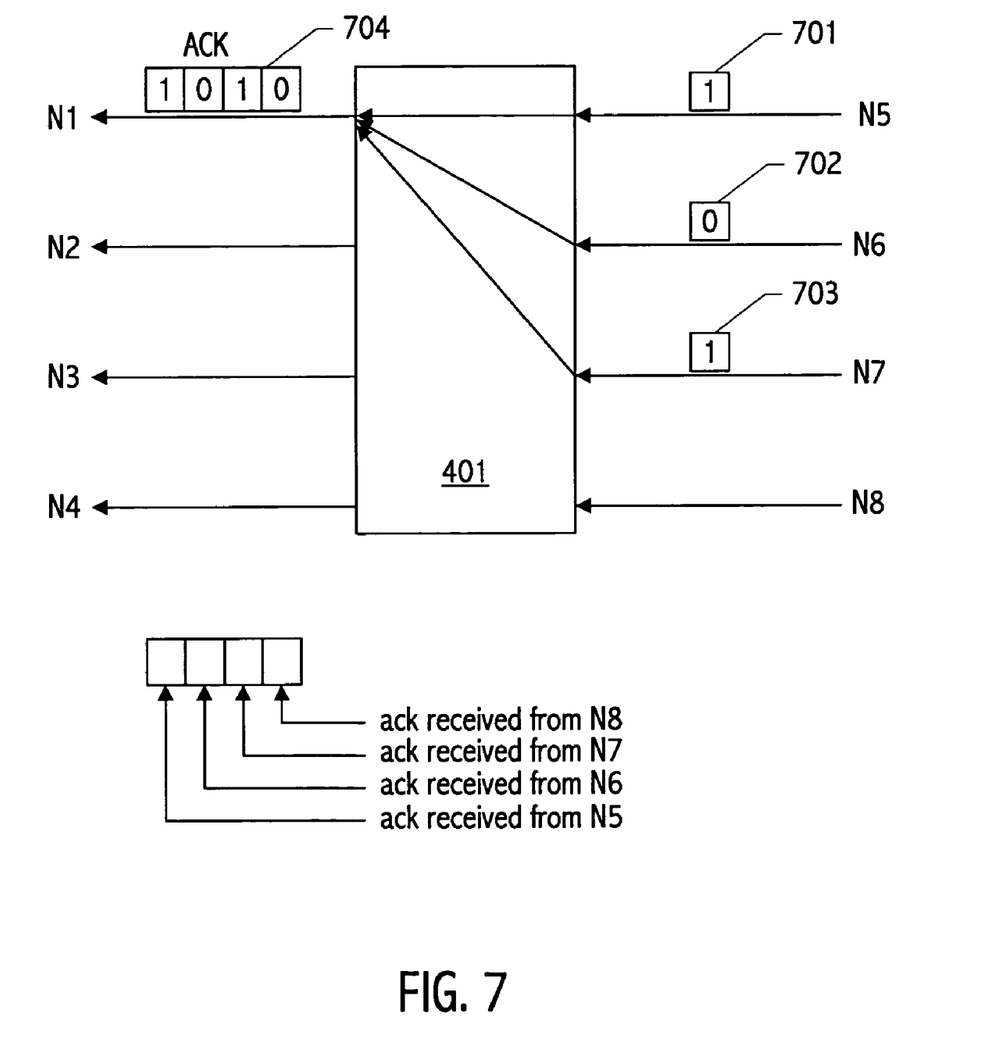
FIG. 7 illustrates how single-bits can be concatenated into a vector.

As would be known in the art, there are many other ways to encode the sources of the acknowledgements and to merge the acknowledge packets. For example, while the OR operation is possible, an embodiment could simply select the relevant bit from each output port acknowledge vector for inclusion in a merged acknowledge vector. Referring to FIG. 7, an example is shown in which single bits from each of the targets is merged into a vector. More particularly, each bit 701, 702 and 703 is concatenated to form vector 704, which is presented to the source to indicate which targets successfully received the multicast data. Alternatively, the switch could provide a count of the number of acknowledging multicast targets that indicated successful receipt, although that implementation would likely require more logic.

In a typical system, the input ports (or the control logic associated with the input ports) are aware of the multicast operation from information contained in a packet header. From that information, the control logic knows to connect the input port to the appropriate output ports. There are various approaches that could be used to alert the output port to merge the acknowledgements received by the input ports from the various targets. For example, an acknowledge packet may be marked as a multicast acknowledgement. Assuming that the packets to be merged arrive at the input ports simultaneously, the output port merges those packets that are destined for it and appropriately marked. Alternatively, e.g., in a pipelined network, the switch can remember that it scheduled a multicast data transfer and merge the acknowledge packets at a particular pipeline stage in the future. It is also possible for acknowledge packets destined for the same port to merge packets whenever there exists multiple acknowledge packets for the same output port. That assumes that acknowledge packets to be merged arrive simultaneously. Thus, a multicast acknowledge would be presumed in such situations. Note that the switch settings for forwarding the acknowledgements can be inferred from settings for forwarding the multicast data.

Figure 8:
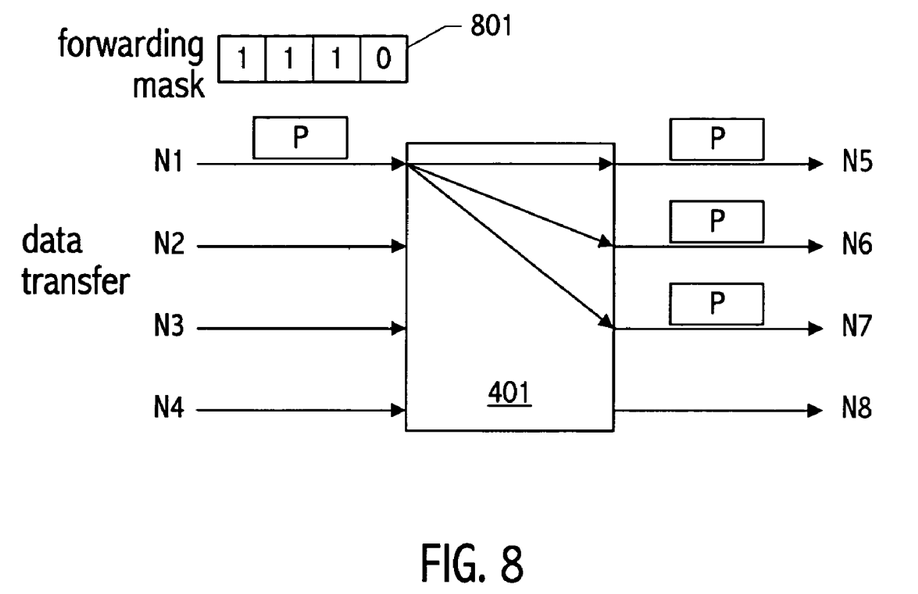
FIG. 8 illustrates the transmission portion of a merged single-bit acknowledgement approach.
Figure 9:
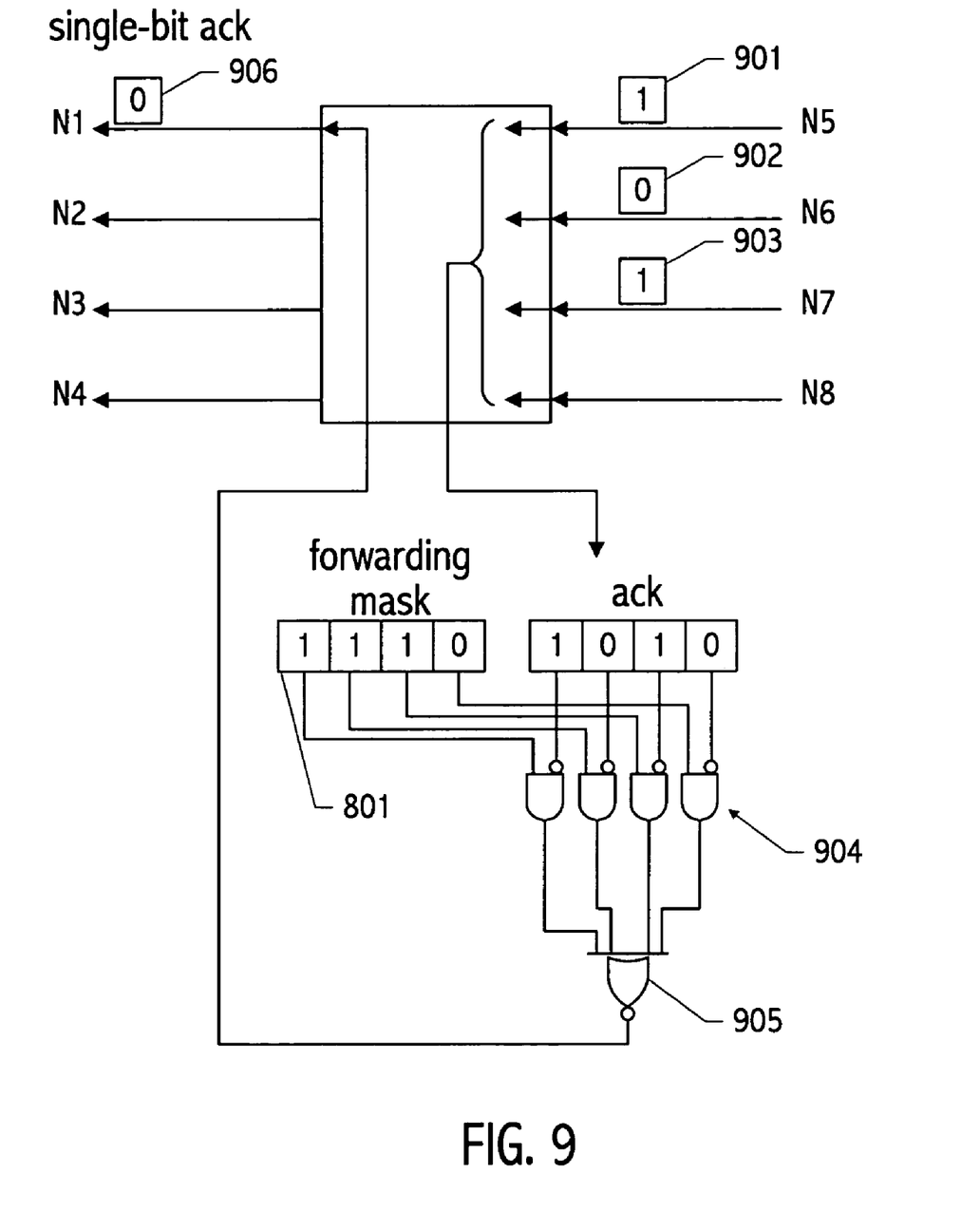
FIG. 9 illustrates the acknowledgement portion of the merged single-bit acknowledge operation.

It is also possible to merge acknowledge packets into an acknowledge packet containing a single bit rather than a bit vector, which is then forwarded on to the initiator node. Atomic operations are one application for a merged single bit acknowledge. Referring to FIGS. 8 and 9, operation of a merged single bit acknowledge is illustrated. In FIG. 8 a multicast operation sends data from initiator node N1 to target nodes N5, N6 and N7. A forwarding mask 801 is generated that indicates which of the possible targets received the multicast data. That forwarding mask is utilized in merging the acknowledgements into a single bit as illustrated in FIG. 9.

Referring to FIG. 9, node N5 sends back acknowledgement 901, node N6 sends back acknowledgement 902, and node N7 sends back acknowledgement 903 as shown. Note that acknowledgement 902 indicates that node N6 failed to properly receive the multicast data. The merging is accomplished as follows. The individual acknowledgements are inverted and logically combined in AND gates 904 with the forwarding mask 801. The output of AND gates 904 are then logically combined in NOR gate 905 to provide the single bit acknowledgement 906 to the initiating node N1. In the example illustrated in FIG. 9, the zero acknowledgement 902 from node N6 causes the single bit acknowledgement to be a zero indicating that a failure occurred. Note that while the acknowledgements 901, 902, and 903 from nodes N5, N6 and N7 are shown as single bits, as one of ordinary skill in the art would understand the acknowledgements can be in the various forms, e.g., an acknowledge packet indicating successful receipt or an acknowledge packet indicating unsuccessful receipt (NACK). Further, the acknowledgement 906 can also be in the form of an acknowledge packet indicating successful transmission or not acknowledge (nack) packet indicating transmission failure. An important aspect of this embodiment is that the overall success or failure of the multicast is encoded in a single bit (or bits) without providing information regarding individual multicast success or failure of the targets.

Other acknowledgement variations are also possible. For example, fine-grained acknowledgements may be used in which separate bits are provided, e.g., for CRC error, permission error, buffer overflow, etc. Thus, an exemplary system combines the individual bits, e.g., for CRC error, for all the acknowledging targets. Again, individual bits can be merged into either a bit vector or a single bit. In the later case, one bit of the merged acknowledgements represent the CRC errors from all the targets, one bit represents all the permission errors etc. The initiator node would know whether or not all targets successfully received the packet with or without a CRC error, or permission error, etc.

Thus, an efficient and reliable multicast operation has been described. While described in relation to a multiport switch, any switching medium that can effectively merge the multicast acknowledges can effectively utilize the invention described herein.

The embodiments described above are presented as examples and are subject to other variations in structure and implementation within the capabilities of one reasonably skilled in the art. The details provided above should be interpreted as illustrative and not as limiting. Variations and modifications of the embodiments disclosed herein, may be made based on the description set forth herein, without departing from the scope and spirit of the invention as set forth in the following claims.

What is claimed is:

1. A networked system comprising:
   a sending node;
   a plurality of receiving nodes coupled to receive multicast information sent from the sending node during a multicast operation and coupled to provide acknowledgements indicating whether the multicast information was successfully received; and
   a switching medium coupled to supply the multicast information to the respective receiving nodes and to receive and combine the respective acknowledgements into a combined acknowledgement that indicates which of the plurality of receiving nodes acknowledged receipt of the multicast information, wherein the merged acknowledgement is supplied to the sending node,
   wherein each acknowledgement comprises a plurality of bits, each bit corresponding to a different node, one bit being set to indicate that a node corresponding to the one bit successfully received the multicast information.

2. The networked system as recited in claim 1 wherein the combined acknowledgement includes a plurality of bits corresponding to multicast targets, each bit of the combined acknowledgement that is set corresponding to a node that successfully received the multicast information.

3. The networked system as recited in claim 1, wherein the networked system includes a switched data network and the switching medium is a network switch.

4. The network system as recited in claim 1 wherein the acknowledgements from the plurality of target nodes are provided to the switching medium at a fixed time relative to the sending of the multicast information.

5. The networked system as recited in claim 1 wherein the combined acknowledgement is provided to the source node at a fixed time relative to the sending of the multicast information.

6. The networked system of claim 1, wherein the networked system is pipelined.

7. The networked system as recited in claim 1, wherein the switching medium combines the acknowledgements in response to information in each acknowledgement packet that indicates a multicast acknowledge is being sent.

8. The networked system as recited in claim 1, wherein the switching medium combines the acknowledgements into the combined acknowledgement if the acknowledgements arrive at the same time in the switching medium and are destined for a same source.

9. The networked system as recited in claim 1, wherein the switching medium combines the acknowledgements in response to having scheduled a multicast data transfer.

10. The networked system as recited in claim 1 wherein the networked systems includes a plurality of hosts, each of the hosts including both a sending node and a receiving node coupled to the switching medium.

11. A networked system comprising:
    a sending node;
    a plurality of receiving nodes coupled to receive multicast information sent from the sending node during a multicast operation and coupled to provide acknowledgements indicating whether the multicast information was successfully received; and
    a switching medium coupled to supply the multicast information to the respective receiving nodes and to receive and combine the respective acknowledgements into a combined acknowledgement that indicates which of the plurality of receiving nodes acknowledge receipt of the multicast information, wherein the merged acknowledgement is supplied to the sending node,
    wherein each acknowledgement comprises a plurality of bits, each bit corresponding to one of a plurality of types of errors.

12. The networked system as recited in claim 11 wherein corresponding bits from respective ones of the acknowledgements are combined in the combined acknowledgement, a bit being set to a first predetermined value in the combined acknowledgement to indicate that one or more of the targets had a particular one of the errors and the bit being set to a second value to indicate that none of the receiving nodes had the particular one of the errors.

13. A networked system comprising:

a sending node;

a plurality of receiving nodes coupled to receive multicast information sent from the sending node during a multicast operation and coupled to provide acknowledgements indicating whether the multicast information was successfully received; and a switching medium coupled to supply the multicast information to the respective receiving nodes and to receive and combine the respective acknowledgements into a combined acknowledgement that indicates which of the plurality of receiving nodes acknowledged receipt of the multicast information, wherein the merged acknowledgement is supplied to the sending node, wherein the networked system is operaable to reserve switch paths for forwarding the acknowledgements based on switch settings used for forwarding the multicast information.

14. A network node comprising:

a plurality of ports to receive and to transmit multicast information;

multicast acknowledgement merging logic coupled with the plurality of ports, the logic to generate a merged multicast acknowledgement that indicates acknowledging target nodes of a multicast, the multicast acknowledgement merging logic to merge multicast acknowledgements to indicate whether a multicast was successful, and the multicast acknowledgement merging logic to set a forwarding mask that indicates those of the plurality of ports that correspond to multicast target nodes.

15. The network node of claim 14, wherein the multicast acknowledgement merging logic includes inverters to invert indications of acknowledging multicast target nodes, AND gates to logically AND the inverted indications with the forwarding mask, and a NOR gate to logical combine output of the AND gates.

16. The network node of claim 14, wherein the network node includes one or more of a router, switch, and a bridge.

17. The network node of claim 14, wherein indication of the acknowledging target nodes comprises indicating those of the plurality of ports that correspond to acknowledging target nodes.

18. The network node of claim 14, wherein indication of the acknowledging target nodes comprises identifying the acknowledging target nodes.

* * * * *

UNITED STATES PATENT AND TRADEMARK OFFICE
CERTIFICATE OF CORRECTION

PATENT NO. : 6,990,098 B1
APPLICATION NO. : 09/659106
DATED : January 24, 2006
INVENTOR(S) : Hans Eberle and Nils Gura It is certified that error appears in the above-identified patent and that said Letters Patent is hereby corrected as shown below:

Column 1,
Line 55, replace "responses" with -- resources --;

Column 2,
Line 52, replace "operations" with -- operation --;
Line 60, replace "multiport" with -- multi-port --;

Column 3,
Line 17, replace "targets" with -- target --;

Column 5,
Line 24, replace "not" with -- no --;

Column 6,
Line 54, replace "acknowledge" with -- acknowledged --.

Signed and Sealed this

Twenty-seventh Day of June, 2006

JON W. DUDAS
*Director of the United States Patent and Trademark Office*